(12) United States Patent
Chen et al.

(10) Patent No.: US 12,284,640 B2
(45) Date of Patent: *Apr. 22, 2025

(54) COMMUNICATION METHOD, MOBILE TERMINAL, BASE STATION, AND COMPUTER READABLE STORAGE MEDIUM

(71) Applicant: VIVO MOBILE COMMUNICATION CO., LTD., Guangdong (CN)

(72) Inventors: Li Chen, Guangdong (CN); Dajie Jiang, Guangdong (CN); Xiaodong Yang, Guangdong (CN); Fei Qin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,459

(22) Filed: Dec. 30, 2022

(65) Prior Publication Data

US 2023/0142710 A1  May 11, 2023

Related U.S. Application Data

(63) Continuation of application No. 16/621,868, filed as application No. PCT/CN2018/090786 on Jun. 12, 2018, now Pat. No. 11,576,176.

(30) Foreign Application Priority Data

Jun. 12, 2017 (CN) .......................... 201710439907.1

(51) Int. Cl.
*H04W 72/0453* (2023.01)
*H04W 36/08* (2009.01)
(Continued)

(52) U.S. Cl.
CPC ....... *H04W 72/0453* (2013.01); *H04W 48/20* (2013.01); *H04W 72/23* (2023.01); *H04W 72/04* (2013.01); *H04W 84/042* (2013.01)

(58) Field of Classification Search
CPC . H04W 72/0453; H04W 36/08; H04W 48/20; H04W 72/042; H04W 84/042;
(Continued)

(56) References Cited

U.S. PATENT DOCUMENTS

2014/0023004 A1    1/2014  Kumar et al.
2015/0156690 A1*   6/2015  Futaki .................. H04W 48/20
                                                              455/436

(Continued)

FOREIGN PATENT DOCUMENTS

CN      101730257 A     6/2010
CN      101772173 A     7/2010
(Continued)

OTHER PUBLICATIONS

First Office Action for Chinese Application No. 201710439907.1, dated Nov. 28, 2019, 14 Pages.
(Continued)

*Primary Examiner* — Hassan A Phillips
*Assistant Examiner* — Prenell P Jones
(74) *Attorney, Agent, or Firm* — BROOKS KUSHMAN P.C.

(57) ABSTRACT

A communication method, a mobile terminal, a base station, and a computer readable storage medium are provided. The present disclosure includes: obtaining a target resource for an uplink communication in a current communication process, where a frequency point corresponding to the target resource includes a first serving frequency point of a non-new radio NR communication system, and a communication system where the mobile terminal is located is a new radio
(Continued)

NR communication system; and communicating with a base station according to the target resource.

18 Claims, 4 Drawing Sheets

(51) Int. Cl.
*H04W 48/20* (2009.01)
*H04W 72/23* (2023.01)
*H04W 84/04* (2009.01)
*H04W 72/04* (2023.01)

(58) Field of Classification Search
CPC . H04W 16/14; H04W 28/02; H04W 28/0205; H04L 5/0053; H04L 5/0091; H04L 5/0098; H04L 5/001
See application file for complete search history.

(56) References Cited

U.S. PATENT DOCUMENTS

| | | | |
|---|---|---|---|
| 2015/0173003 A1* | 6/2015 | Li | H04W 72/56 455/552.1 |
| 2017/0070931 A1 | 3/2017 | Huang et al. | |
| 2017/0142702 A1 | 5/2017 | Yu et al. | |
| 2017/0163392 A1 | 6/2017 | Lim et al. | |
| 2018/0041936 A1 | 2/2018 | Kim et al. | |
| 2018/0098334 A1 | 4/2018 | Tie et al. | |
| 2018/0104426 A1 | 4/2018 | Oldfield et al. | |
| 2018/0184426 A1 | 6/2018 | Li | |
| 2018/0227822 A1* | 8/2018 | Lin | H04W 36/302 |
| 2019/0037546 A1 | 1/2019 | You et al. | |
| 2019/0081764 A1 | 3/2019 | Guan et al. | |
| 2019/0174406 A1* | 6/2019 | Hwang | H04B 17/318 |
| 2020/0037355 A1 | 1/2020 | Fei et al. | |
| 2020/0404679 A1* | 12/2020 | Beale | H04W 72/542 |
| 2021/0153199 A1* | 5/2021 | Wong | H04W 76/10 |
| 2021/0289489 A1* | 9/2021 | Liu | H04W 72/21 |

FOREIGN PATENT DOCUMENTS

| | | |
|---|---|---|
| CN | 102111882 A | 6/2011 |
| CN | 102137461 A | 7/2011 |
| CN | 102833804 A | 12/2012 |
| CN | 103209441 A | 7/2013 |
| CN | 103458462 A | 12/2013 |
| CN | 104023362 A | 9/2014 |
| CN | 104488206 A | 4/2015 |
| CN | 105007606 A | 10/2015 |
| CN | 105519188 A | 4/2016 |
| CN | 105898812 A | 8/2016 |
| CN | 106304374 A | 1/2017 |
| CN | 106792718 A | 5/2017 |
| CN | 108811155 A | 11/2018 |
| CN | 110073689 A | 7/2019 |
| EP | 3522666 A1 | 8/2019 |
| WO | 2015109435 A1 | 7/2015 |

OTHER PUBLICATIONS

3GPP TSG RAN WGI Meeting #89 RI-1707933, "4-step RACH procedure", Hangzhou, China, May 15, 2017, 12 pages.
Second Office Action for Chinese Application No. 201710439907.1, dated , Mar. 9, 2020, 13 Pages.
3GPP TSG RAN WGI Meeting #89 RI-1706905, Overview of NR UL for LTE-NR coexistence, Hangzhou, China, May 15, 2017, 12 pages.
3GPP TSG RAN WG1 Meeting #89 R1-1707421, "NR LTE coexistence remaining issues", Hangzhou, China, May 15, 2017, 3 pages.
3GPP TSG RAN WG1 Meeting #89 R1-1707528, "Support of UL carrier sharing between NR-LTE", Hangzhou, China, May 15, 2017, 3 pages.
3GPP TSG RAN WG1 Meeting #89 R1-1708654, "NR LTE Adjacent Channel Coexistence Consideration", Hangzhou, China, May 15, 2017, 4 pages.
Extended European Search Report for Application No. 18818488. 1-1205, dated May 4, 2020, 10 pages.
Intel Corporation: "Cell reselection and measurements",3GPP Draft, R2-1700344, Spokane, USA, Jan. 17, 2017, 4 pages.
Ericsson: "Acquisition of System Information during Cell Reselection and Handover",3GPP Draft; R4-071281, Athens, Greece, Aug. 15, 2007, 3 pages.
International Search Report and Written Opinion for Application No. PCT /CN2018/090786, dated Aug. 29, 2018, 6 Pages.
Search Report No. G1903537 for Application No. 201710439907.1, dated Apr. 17, 2019, 5 pages.
Office Action for U.S. Appl. No. 16/621,868, dated Oct. 28, 2021, 28 Pages.

* cited by examiner

COMMUNICATION METHOD, MOBILE TERMINAL, BASE STATION, AND COMPUTER READABLE STORAGE MEDIUM

CROSS REFERENCE OF RELATED APPLICATIONS

This application is a continuation of U.S. application Ser. No. 16/621,868 filed on Dec. 12, 2019, now U.S. Pat. No. 11,576,176, issued Feb. 7, 2023, which is the U.S. national phase of PCT Application No. PCT/CN2018/090786 filed on Jun. 12, 2018, which claims priority to Chinese Patent Application No. 201710439907.1 filed on Jun. 12, 2017, which are incorporated herein by reference in their entireties.

TECHNICAL FIELD

The present disclosure relates to the technical field of communication applications, and in particular to a communication method, a mobile terminal, a base station, and a computer readable storage medium.

BACKGROUND

In the future, some operators will deploy 5G new radio (NR) on the C carrier (around 3.5 GHz). However, uplink and downlink budgets at 3.5 GHz have a large difference (a loss of downlink transmission is about 10 dB lower than a loss of an uplink transmission), which causes that an uplink coverage is significantly smaller than a downlink coverage.

The main reason for the large difference between the uplink and downlink budgets is that an uplink transmit power of a mobile terminal is much lower than a downlink transmit power of a base station, a downlink antenna is configured with 64 transmitters and 4 receivers, and an uplink antenna is configured with 1 transmitters and 64 receivers, which causes that the uplink coverage is significantly smaller than the downlink coverage. The difference between the uplink and downlink budgets causes a coverage of 5G network to be limited to the uplink coverage, and the uplink coverage of 3.5 GHz is 5 dB worse than an uplink coverage of 4G network of 2.6 GHz of China Mobile (a gap mainly at a propagation loss), which causes that the 5G base station cannot achieve continuous coverage when sharing a station address with a 4G base station, thereby adversely affecting usage experience of 5G users.

In order to solve the above-mentioned problem that the uplink and downlink budgets of 5G have a large difference, and to support Long Term Evolution (LTE) to be gradually upgraded to NR in a frequency domain, the 3GPP Rel-15 NR WI (work item) includes research contents of co-existence of uplink spectrums of LTE and NR. However, there is no relevant solution in the uplink spectrum co-existence technology for how to perform cell camping, access, and/or uplink transmission.

SUMMARY

The present disclosure provides a communication method, applied to a mobile terminal, which includes:
obtaining a target resource for an uplink communication in a current communication process, where a frequency point corresponding to the target resource includes a first serving frequency point of a non-new radio NR communication system, and a communication system where the mobile terminal is located is a new radio NR communication system; and
communicating with a base station according to the target resource.

The present disclosure further provides a communication method, applied to a base station, which includes:
transmitting resource indication information to a mobile terminal, to enable the mobile terminal to determine a target resource for an uplink communication in a current communication process according to the resource indication information and communicate with the base station according to the target resource,
where a frequency point corresponding to the target resource includes a first serving frequency point of a non-new radio NR communication system, and a communication system where the mobile terminal is located is a new radio NR communication system.

The present disclosure further provides a mobile terminal, which includes:
an obtaining module, configured to obtain a target resource for an uplink communication in a current communication process, where a frequency point corresponding to the target resource includes a first serving frequency point of a non-new radio NR communication system, and a communication system where the mobile terminal is located is a new radio NR communication system; and
a communication module, configured to communicate with a base station according to the target resource.

The present disclosure further provides a mobile terminal, which includes a first memory, a first processor, and a first computer program stored on the first memory and executable on the first processor. When executing the first computer program, the first processor is configured to perform steps of the above communication method.

The present disclosure further provides a computer readable storage medium, which stores a first computer program. The first computer program is executed by a processor to implement steps of the above communication method.

The present disclosure further provides a base station, which includes: a second transmission module, configured to transmit resource indication information to a mobile terminal, to enable the mobile terminal to determine a target resource for an uplink communication in a current communication process according to the resource indication information and communicate with the base station according to the target resource, where a frequency point corresponding to the target resource includes a first serving frequency point of a non-new radio NR communication system, and a communication system where the mobile terminal is located is a new radio NR communication system.

The present disclosure further provides a base station, which includes a second memory, a second processor, and a second computer program stored on the second memory and executable on the second processor. When executing the second computer program, the second processor is configured to perform steps of the above communication method.

The present disclosure further provides a computer readable storage medium, which stores a second computer program, and the second computer program is executed by a processor to implement steps of the above communication method.

DETAILED DESCRIPTION

Technical solutions in embodiments of the present disclosure are clearly and completely described below with reference to accompanying drawings in the embodiments of the present disclosure. It is obvious that the described embodiments are only a part of the embodiments of the present disclosure, and not all of the embodiments of the present disclosure. All other embodiments obtained by a person of ordinary skill in the art without creative effort based on the embodiments of the present disclosure shall fall within the protection scope of the present disclosure.

Figure 1:
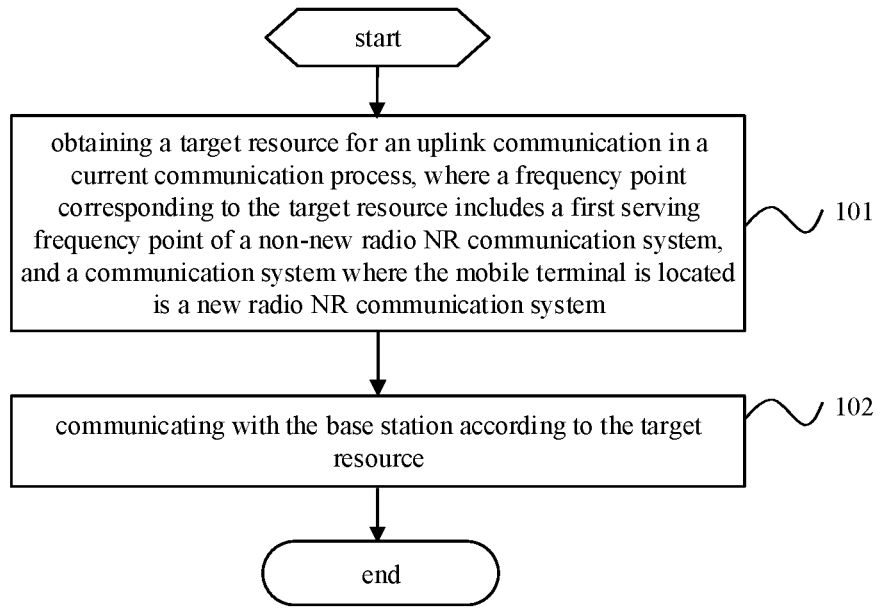
FIG. 1 is an operational flow chart of a communication method according to some embodiments of the present disclosure.

As shown in FIG. 1, some embodiments of the present disclosure provide a communication method, which is applied to a mobile terminal, and includes steps 101 and 102.

Step 101 includes: obtaining a target resource for an uplink communication in a current communication process, where a frequency point corresponding to the target resource includes a first serving frequency point of a non-new radio NR communication system, and a communication system where the mobile terminal is located is a new radio NR communication system.

The first serving frequency point specifically includes 1.8 GHz, 800 MHz, 900 MHz, 2.3 GHz, 2.6 GHz, or 2.1 GHz. An example of 1.8 GHz is given in the following, and the other frequency points are similar. The second serving frequency point is specifically a 5G NR deployment frequency point, including 3.5 GHz or other frequency points, 3.5 GHz is given as an example below, and the other frequency points are similar.

The non-new radio NR communication system in this specification may be specifically an LTE communication system, and the current communication process specifically includes processes of cell camping, random access or data transmission. Since the communication system where the mobile terminal is located is a new radio NR communication system, the mobile terminal can perform uplink transmission or downlink transmission through a second serving frequency point (such as 3.5 GHz) of the NR communication system. The frequency point corresponding to the target resource includes the first serving frequency point of the LTE communication system (such as 1.8 GHz), so that the mobile terminal can also perform uplink transmission through the first serving frequency point. That is, the LTE system and the NR communication system share the first serving frequency point, and thereby solving a problem in the 5G NR system that an uplink coverage is significantly smaller than the downlink coverage.

The frequency point mentioned above is a common frequency point in the industry. The specific frequency point information is as following:

for time division duplex TDD systems:
  1.8 GHz: 1880 MHz-1900 MHz (bands: 39);
  2.3 GHz: 2320 MHz-2370 MHz, or 2300 MHz-2320 MHz, or 2370 MHz-2390 MHz (bands: 40);
  2.5 GHz: 2575 MHz-2635 MHz, or 2555 MHz-2575 MHz, or 2635 MHz-2655 MHz (bands: 41); and for frequency division duplex FDD systems:
  1.8 GHz: 1755 MHz-1785 MHZ, or 1850 MHz-1880 MHz;
  2.1 GHz: 1955 MHz-1980 MHz, or 2145 MHz-2170 MHz.

The 800 MHz and 900 MHz frequency points also include any one of 800 MHz and 900 MHz used in CDMA, GSM, and TD-SCDMA systems.

Further, the frequency point corresponding to the target resource further includes a second serving frequency point of the new radio NR communication system.

Step 102 includes: communicating with the base station according to the target resource.

Specifically, the terminal camps on a cell corresponding to the base station according to the target resource and performs data transmission with the base station, or the terminal accesses to the cell corresponding to the base station according to the target resource and performs data transmission with the base station.

The communication method according to the embodiments of the present disclosure includes obtaining a target resource for an uplink communication in a current communication process, where a frequency point corresponding to the target resource includes a first serving frequency point of a LTE communication system, a communication system where a mobile terminal is located is a new radio NR communication system, and communicating with a base station according to the target resource. In the embodiments of the present disclosure, uplink transmission may be performed by using the first serving frequency point of the LTE communication system and the second serving frequency point of the NR communication system, and communication between the terminal and the base station is achieved on the premise of sharing the uplink frequency point.

As an optional implementation manner, the above step 101 includes sub-step 1011, which includes: obtaining the target resource for the uplink communication in the current communication process based on an agreement of a pre-defined protocol.

In an embodiment of the present disclosure, an uplink frequency point used in processes of cell camping, random access, and data transmission may be pre-defined in a protocol.

As another optional implementation manner, the above step 101 includes substep 1012, which includes: obtaining the target resource for the uplink communication in the current communication process according to resource indication information transmitted by the base station.

The resource indication information herein is transmitted by the base station by using at least one of: a reference signal, a physical broadcast channel, system information, or a dedicated radio resource control RRC signaling. Alternatively, the resource indication information is transmitted by a newly added reference signal or a newly added channel in a synchronization signal block.

The base station broadcasts in a physical broadcast channel PBCH (Master system Information Block, MIB), a synchronization signal block, or a system information block SIB (a certain SIB message, such as SIB2), or informs a UE of an uplink transmission frequency through a dedicated radio resource control RRC signaling, or informs the UE of a frequency used for random access or a frequency used for camping, for example, 3.5 GHz and/or 1.8 GHz, which makes the UE know which frequency point is used to perform random access, uplink transmission, or camping.

The resource indication information transmitted by the base station enables the terminal to know the frequency point for accessing or camping earlier.

The above target resource specifically includes a cell or a frequency point.

In a case that the above target resource is a cell, the above substep 1012 includes substep 10121, which includes: selecting a target cell to camp on from candidate cells according to a frequency point supported by the mobile terminal, in a case that the resource indication information includes frequency point information corresponding to the candidate cells, and determining the target cell as the target resource.

Specifically, it is determining that a first candidate cell bars the mobile terminal from camping on or accessing to the first candidate cell, and selecting the target cell to camp on from the other candidate cells except the first candidate cell, in a case that frequency point information corresponding to the first candidate cell in the candidate cells indicates that the first candidate cell supports the first serving frequency point for uplink transmission or does not support a second serving frequency point of the NR communication system for uplink transmission, and an uplink frequency point supported by the mobile terminal does not include the first serving frequency point.

In an embodiment of the present disclosure, the base station transmits the frequency point information corresponding to the candidate cells to the terminal, so that the terminal can identify earlier whether the candidate cell is a cell barring the mobile terminal from camping on or accessing to the cell, so as to avoid the mobile terminal delaying initiating a service.

In a case that the above target resource is a cell, the above substep 1012 further includes: correcting a determination parameter used in performing cell reselection or cell selection for each of the candidate cells based on a preset offset parameter, in a case that the resource indication information includes the frequency point information corresponding to the candidate cells, where the determination parameter is calculated according to an S criterion or an R criterion for cell selection; and determining the target cell according to the corrected determination parameter.

A step of correcting the determination parameter used in performing cell reselection or cell selection for each of the candidate cells based on the preset offset parameter includes:

adding the preset offset parameter to the determination parameter, in a case that the uplink frequency point supported by the mobile terminal includes the first serving frequency point, and the frequency point information corresponding to one of the candidate cells indicates that the one candidate cell supports the first serving frequency point to be used for uplink transmission or does not support the second serving frequency point of the NR communication system to be used for uplink transmission; or subtracting the preset offset parameter from the determination parameter, in a case that the uplink frequency point supported by the mobile terminal does not include the first serving frequency point, or the frequency point information corresponding to one of the candidate cells indicates that the one candidate cell does not support the first serving frequency point to be used for uplink transmission or supports the second serving frequency point of the NR communication system to be used for uplink transmission.

The mobile terminal can camp on a cell matching the supported frequency point and the capability of the mobile terminal with a relatively high probability, by correcting the above-mentioned determination parameter.

In a case that the above target resource is a cell, the above substep 1012 further includes: setting camping priorities for the candidate cells according to the frequency point supported by the mobile terminal and the frequency point information corresponding to the candidate cells; and selecting the target cell to camp on from the candidate cells according to the respective camping priorities of the candidate cells.

Herein, according to the S criterion or the R criterion applied to the cell selection, the cell selection is performed on the candidate cells having the respective camping priorities to obtain the target cell to camp on.

A step of setting the camping priorities for the candidate cells according to the frequency point supported by the mobile terminal and the frequency point information corresponding to the candidate cells includes:

increasing a camping priority of each of the candidate cells, in a case that an uplink frequency point supported by the mobile terminal includes the first serving frequency point, and the frequency point information corresponding to the each candidate cell indicates that the each candidate cell supports the first serving frequency point for uplink transmission or does not support a second serving frequency point of the NR communication system for uplink transmission; or decreasing the camping priority of each of the candidate cells, in a case that an uplink frequency point supported by the mobile terminal does not include the first serving frequency point, and the frequency point information corresponding to the each candidate cell indicates that the each candidate cell supports the first serving frequency point for uplink transmission or does not support a second serving frequency point of the NR communication system for uplink transmission.

Herein, the camping priorities of the candidate cells are adjusted so that the mobile terminal can camp on a cell matching the supported frequency point and the capability of the mobile terminal with a relatively high probability.

In a case that the above target resource is a cell, the above substep 1012 includes substep 10122, which includes: determining an available uplink frequency point as the target resource, in a case that the resource indication information includes the available uplink frequency point, where the available uplink frequency point is configured by the base station according to capability information reported by the mobile terminal, and the capability information includes an uplink frequency point supported by the mobile terminal.

Further, prior to the above substep 10122, the method further includes: transmitting the capability information of the mobile terminal to the base station, where the capability information includes the uplink frequency point supported by the mobile terminal.

Further, the above capability information further includes: whether the mobile terminal supports using the first serving frequency point as the uplink frequency point to perform access or perform uplink data transmission in a slot corresponding to downlink transmission.

The mobile terminal reports the capability information, so that when the UE performs downlink reception using the second serving frequency point, a network does not configure uplink access or uplink transmission resources for the UE; when the UE does not use the second serving frequency point to perform downlink reception, the network may configure uplink access or uplink transmission resources for the UE.

Optionally, the communications method further includes: before the mobile terminal transmits the capability information, notifying, by a network, the UE of an access mode supported by the network through a broadcast or a dedicated RRC signaling; or notifying, by the network, the UE of an uplink transmission mode supported by the network through a broadcast or a dedicated RRC signaling. The access mode and the uplink transmission mode herein refer to whether the UE supports using the first serving frequency point to perform uplink transmission in a slot where downlink reception is performed in the second serving frequency point at a same time.

As an optional implementation manner, in the above step 102, the communicating with the base station according to the target resource includes:

performing camping according to the target resource, or performing access and/or uplink transmission according to the target resource after camping is performed according to the target resource; or performing access according to the target resource, or performing uplink transmission according to the target resource access after access is performed according to the target resource; or performing uplink transmission according to the target resource.

As another optional implementation, in the above step 102, the communicating with the base station according to the target resource includes:

performing camping according to a frequency point for camping, or performing access and/or uplink transmission according to the frequency point for camping after camping is performed according to the frequency point for camping, in a case that the target resource includes the frequency point for camping;

performing access according to a frequency point for access, or performing uplink transmission according to the frequency point for access after access is performed according to the frequency point for access, in a case that the target resource includes the frequency point for access; and performing uplink transmission according to a frequency point for uplink transmission, in a case that the target resource includes the frequency point for uplink transmission.

Optionally, the performing camping according to the target resource includes:

obtaining a first signal strength threshold corresponding to the first serving frequency point and a second signal strength threshold corresponding to a second serving frequency point, in a case that the target resource includes the first serving frequency point and the second serving frequency point; and selecting the first serving frequency point or the second serving frequency point to camp on, according to the first signal strength threshold, the second signal strength threshold, and a current reference signal received power RSRP.

A step of obtaining the first signal strength threshold corresponding to the first serving frequency point and the second signal strength threshold corresponding to the second serving frequency point includes: obtaining, through a first notification message broadcasted by the base station, the first signal strength threshold corresponding to the first serving frequency point and the second signal strength threshold corresponding to the second serving frequency point.

In the embodiments of the present disclosure, when the mobile terminal can camp on two frequency points, different thresholds for cell selection or cell reselection may be set for different frequency points. When the terminal determines that the current reference signal received power RSRP reaches a threshold corresponding to a certain frequency point, the terminal may select a corresponding cell and camp on the corresponding frequency point.

Optionally, a step of performing access according to the target resource includes:

obtaining a third signal strength threshold corresponding to the first serving frequency point and a fourth signal strength threshold corresponding to a second serving frequency point, in a case that the target resource includes the first serving frequency point and the second serving frequency point; and selecting the first serving frequency point or the second serving frequency point to access, according to the third signal strength threshold, the fourth signal strength threshold, and a current reference signal received power RSRP.

A step of obtaining the third signal strength threshold corresponding to the first serving frequency point and the fourth signal strength threshold corresponding to the second serving frequency point includes: obtaining, through a second notification message broadcasted by the base station, the third signal strength threshold corresponding to the first serving frequency point and the fourth signal strength threshold corresponding to the second serving frequency point.

In the embodiments of the present disclosure, when the mobile terminal can access to two frequency points, different random access thresholds can be set for different frequency points. When the terminal determines that the current reference signal received power RSRP reaches a threshold corresponding to a certain frequency point, the terminal may select the corresponding frequency point, and perform random access to the corresponding frequency point.

Further, the above step 102 includes: performing access or uplink transmission in a slot except a predetermined slot and by using the first serving frequency point as an uplink frequency point, where the predetermined slot is a slot used to perform downlink reception by the mobile terminal using a downlink serving frequency point of the NR communication system.

Specifically, the above predetermined slot include: a slot in which downlink reception is performed in a connected mode and using the downlink serving frequency point, and a slot in which downlink reception is performed in an idle mode and using the downlink serving frequency point. The slot in which downlink reception is performed in a connected mode and using the downlink serving frequency point includes: a slot for receiving downlink control information, a slot for receiving downlink data, a slot for receiving a broadcast message, a slot for receiving a paging message, and a slot for receiving reference information. The slot in which downlink reception is performed in an idle mode and using the downlink serving frequency point includes: a slot for receiving downlink control information, a slot for receiving a paging message, and a slot for receiving reference information.

Figure 2:
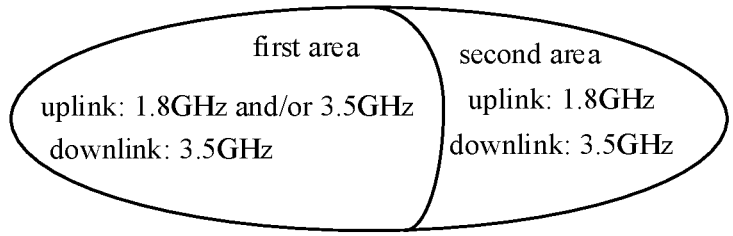
FIG. 2 is a schematic diagram of coverage of frequency points of a base station in a communication method according to some embodiments of the present disclosure.

It is assumed that uplink frequencies of a NR system include 3.5 GHz and 1.8 GHz that is shared with LTE, and the downlink frequency of the NR system is only 3.5 GHz. The coverage of 1.8 GHz is larger than the coverage of 3.5 GHz. As shown in FIG. 2, a first area is close to the base station, and the UE can perform uplink transmission using 1.8 GHz and/or 3.5 GHz; a second area is far from the base station, and the UE can perform uplink transmission only using 1.8 GHz.

Figure 3:
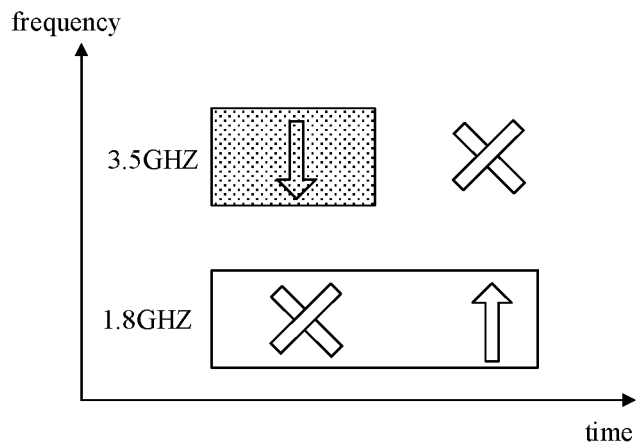
FIG. 3 is a schematic diagram of transmission in a communication method according to some embodiments of the present disclosure.

The uplink of the NR system shares 1.8 GHz of the LTE system, and when the mobile terminal uses 3.5 GHz to perform downlink reception, it is not possible to use the 1.8 GHz to perform uplink transmission at the same time. As shown in FIG. 3, the mobile terminal can perform uplink transmission using 1.8 GHz only when 3.5 GHz is not used to perform downlink reception. This scheme allows the UE to have only one transceiver to perform uplink transmission and downlink transmission in a time-division manner, which not only saves the cost of one duplexer, but also reduces adverse effects of intermodulation interference and second harmonic wave.

A specific application of the embodiments of the present disclosure is described below.

The base station broadcasts in a physical broadcast channel PBCH (Master system Information Block, MIB), a synchronization signal block, or a system information block SIB (a certain SIB message, such as SIB2), or informs a UE of an uplink transmission frequency through a dedicated radio resource control RRC signaling, or informs the UE of a frequency used for random access or a frequency used for camping, for example, 3.5 GHz and/or 1.8 GHz, which makes the UE know which frequency point is used to perform random access, uplink transmission, or camping. It is assumed that the first serving frequency point is 1.8 GHz, and the second serving frequency point is 3.5 GHz.

(I) A mobile terminal selecting a frequency point to camp on according to a broadcasted frequency:
(1) if 3.5 GHz and 1.8 GHz are broadcasted, a UE can camp on 3.5 GHz and/or 1.8 GHz;
(2) if only 1.8 GHz is broadcasted,
UEs all camp on 1.8 GHz, or
each UE camps on 3.5 GHz and/or 1.8 GHz (implicitly supporting that 3.5 GHz can be used for camping);
(3) if only 3.5 GHz is broadcasted, the UE camps on 3.5 GHz; or
(4) if 3.5 GHz and 1.8 GHz are not broadcasted, the UE camps at 3.5 GHz (implicitly supporting that 3.5 GHz can be used for camping); and
after the UE has camped on 3.5 GHz or 1.8 GHz, the UE performs uplink access as followings:
a. continuing to use the frequency point on which the UE has camped, to perform uplink access;
b. using 3.5 GHz frequency point to perform uplink access; or
c. using 1.8 GHz frequency point to perform uplink access.
(II) Random access:
(1) if 3.5 GHz and 1.8 GHz are broadcasted, the UE can access at 3.5 GHz and/or 1.8 GHz;
(2) if only 1.8 GHz is broadcasted,
UEs all access at 1.8 GHz, or
each UE accesses to 3.5 GHz and/or 1.8 GHz (implicitly supporting that 3.5 GHz can be used to perform uplink access);
(3) if only 3.5 GHz is broadcasted, the UE accesses to 3.5 GHz; or
(4) if 3.5 GHz and 1.8 GHz are not broadcasted, the UE accesses to 3.5 GHz (implicitly supporting that 3.5 GHz can be used to perform uplink access); and
after the UE has accessed to 3.5 GHz or 1.8 GHz, the UE performs uplink transmission as followings:
continuing to use the frequency point to which the UE has accessed, to perform uplink transmission; or
using 3.5 GHz frequency to perform uplink transmission.

Optionally, after the UE accesses to a certain frequency point, the UE may transmit a request of a frequency point used to perform uplink transmission (for example, according to a UE capability, an RRC message or a UE assistance reporting message request), and a base station side configures an uplink transmission resource for the UE according to the received request from the UE.

Implementations of the uplink transmission (UL transmission) are similar to these of RACH.

(III) Uplink transmission:
(1) if 3.5 GHz and 1.8 GHz are broadcasted, the UE can perform uplink transmission on 3.5 GHz and/or 1.8 GHz;
(2) if only 1.8 GHz is broadcasted,
UEs all perform uplink transmission on 1.8 GHz uplink; or
each UE performs uplink transmission on 3.5 GHz and/or 1.8 GHz (implicitly supporting that 3.5 GHz can be used to perform uplink transmission);
(3) if only 3.5 GHz is broadcasted, the UE performs uplink transmission on 3.5 GHz; or
(4) if 3.5 GHz and 1.8 GHz are not broadcasted, and the UE performs uplink transmission on the 3.5 GHz (implicitly supporting that 3.5 GHz can be used to perform uplink transmission).

The communication method according to an embodiment of the present disclosure may also be independent of a broadcasted frequency point, and in the absence of the broadcast frequency point, a certain frequency point defined in a protocol or a default 1.8 GHz is directly used to perform random access or camping, or uplink transmission is performed directly in an area where 3.5 GHz and/or 1.8 GHz is located.

The communication method according to the embodiments of the present disclosure includes obtaining a target resource for an uplink communication in a current communication process, where a frequency point corresponding to the target resource includes a first serving frequency point of a LTE communication system, a communication system where a mobile terminal is located is a new radio NR communication system, and communicating with a base station according to the target resource. In the embodiments of the present disclosure, uplink transmission may be performed by using the first serving frequency point of the LTE communication system and the second serving frequency point of the NR communication system, and the terminal communicates with the base station on the premise of sharing an uplink frequency point.

Figure 4:
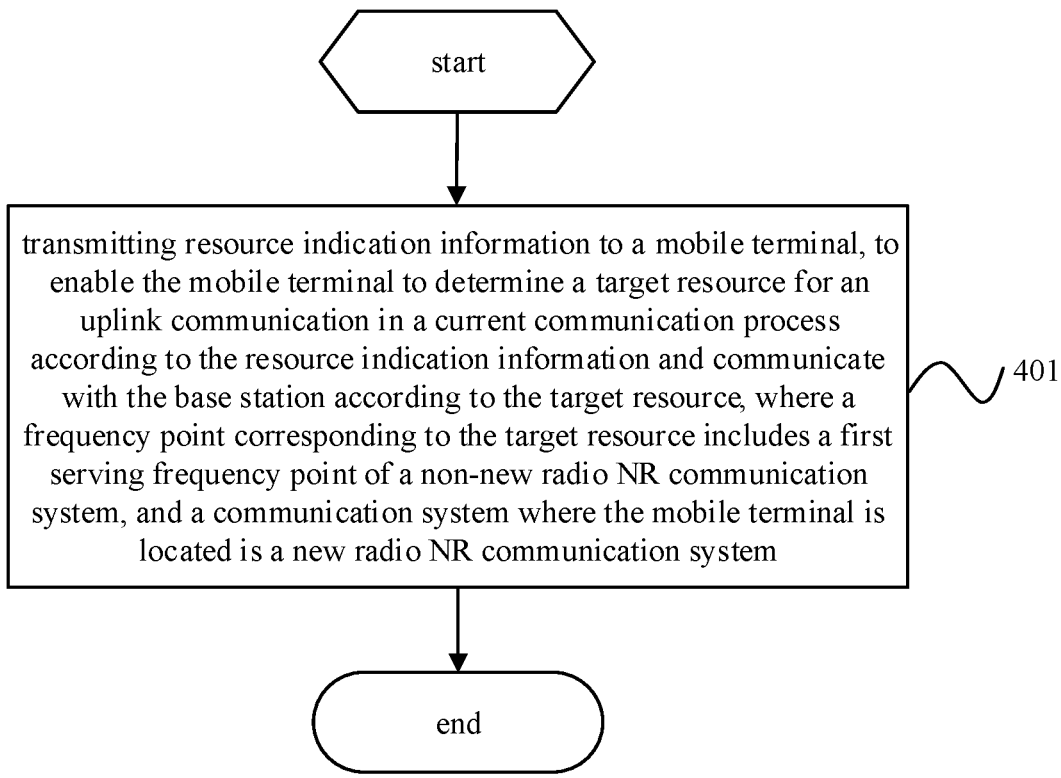
FIG. 4 is an operational flow chart of a communication method according to other embodiments of the present disclosure.

As shown in FIG. 4, some embodiment of the present disclosure further provides a communication method, which is applied to a base station, and includes step 401: transmitting resource indication information to a mobile terminal, to enable the mobile terminal to determine a target resource for an uplink communication in a current communication process according to the resource indication information and communicate with the base station according to the target resource, where a frequency point corresponding to the target resource includes a first serving frequency point of a non-new radio NR communication system, and a communication system where the mobile terminal is located is a new radio NR communication system.

The communication method according to the embodiments of the present disclosure includes transmitting resource indication information to a mobile terminal, so that the mobile terminal obtains a target resource for an uplink communication in a current communication process, and communicates with a base station according to the target resource, where a frequency point corresponding to the target resource includes a first serving frequency point of a LTE communication system, and a communication system where a mobile terminal is located is a new radio NR communication system. In the embodiments of the present disclosure, uplink transmission may be performed by using the first serving frequency point of the LTE communication system and the second serving frequency point of the NR communication system, and communication between the terminal and the base station is achieved on the premise of sharing an uplink frequency point.

Further, the frequency point corresponding to the target resource further includes a second serving frequency point of the new radio NR communication system.

Further, the above step 401 includes: transmitting the resource indication information through at least one of: a reference signal, a physical broadcast channel, system information, or a dedicated radio resource control RRC signaling.

Further, in the above step 401, a step of transmitting the resource indication information to the mobile terminal includes: transmitting the resource indication information to the mobile terminal by using a newly added reference signal or a newly added channel; or transmitting the resource indication information to the mobile terminal by using a reference signal or a channel newly added into a synchronization signal block.

Further, the above step 401 includes: transmitting frequency point information corresponding to candidate cells as the resource indication information to the mobile terminal.

Further, the above step 401 includes:
obtaining capability information transmitted by the mobile terminal, where the capability information includes a frequency point supported by the mobile terminal; and
configuring, according to the frequency point supported by the mobile terminal, an available uplink frequency point for the mobile terminal, and transmitting the available uplink frequency point as the resource indication information to the mobile terminal.

Further, the capability information further includes: whether the mobile terminal supports using the first serving frequency point as the uplink frequency point to perform access or perform uplink data transmission in a slot corresponding to downlink transmission.

A step of configuring, according to the capability information, the available uplink frequency point for the mobile terminal includes: configuring the first serving frequency point as the available uplink frequency point in a slot that is not used by the mobile terminal to perform downlink reception on a downlink serving frequency point, in a case that the mobile terminal does not support using the first serving frequency point as the uplink frequency point to perform access or perform uplink data transmission in the slot corresponding to downlink transmission.

The mobile terminal reports the capability information, so that when the UE performs downlink reception using the second serving frequency point, the network does not configure uplink access or uplink transmission resources for the UE; when the UE does not use the second serving frequency point to perform downlink reception, the network may configure uplink access or uplink transmission resources for the UE.

It is assumed that the uplink of the NR system shares 1.8 GHz of the LTE system, and when the mobile terminal uses 3.5 GHz to perform downlink reception, it is not possible to use the 1.8 GHz to perform uplink transmission at the same time. As shown in FIG. 3, the mobile terminal can perform uplink transmission using 1.8 GHz only when 3.5 GHz is not used to perform downlink reception. Such scheme allows the UE to have only one transceiver to perform uplink transmission and downlink transmission in a time-division manner, which not only saves the cost of one duplexer, but also reduces adverse effects of intermodulation interference and second harmonic wave.

Figure 5:
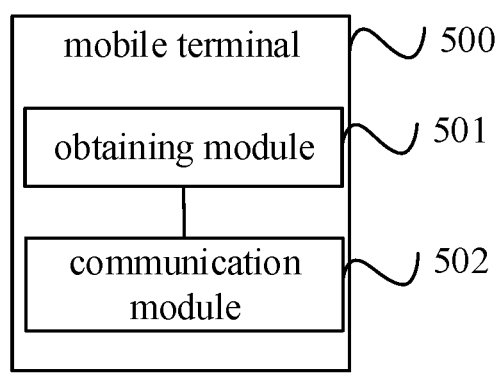
FIG. 5 is a structural block diagram of a mobile terminal according to some embodiments of the present disclosure.

As shown in FIG. 5, some embodiments of the present disclosure further provides a mobile terminal 500, which includes:
an obtaining module 501, configured to obtain a target resource for an uplink communication in a current communication process, where a frequency point corresponding to the target resource includes a first serving frequency point of a non-new radio NR communication system, and a communication system where the mobile terminal is located is a new radio NR communication system; and
a communication module 502, configured to communicate with a base station according to the target resource.

In the mobile terminal according to an embodiment of the present disclosure, the frequency point corresponding to the target resource further includes a second serving frequency point of the new radio NR communication system.

In the mobile terminal according to an embodiment of the present disclosure, the obtaining module 501 is configured to obtain the target resource for the uplink communication in the current communication process based on an agreement of a predefined protocol.

In the mobile terminal according to an embodiment of the present disclosure, the obtaining module 501 is configured to obtain the target resource for the uplink communication in the current communication process according to resource indication information transmitted by the base station.

In the mobile terminal according to an embodiment of the present disclosure, the obtaining module 501 includes: a first obtaining submodule, configured to: select a target cell to camp on from candidate cells according to a frequency point supported by the mobile terminal, in a case that the resource indication information includes frequency point information corresponding to the candidate cells, and determine the target cell as the target resource.

In the mobile terminal according to an embodiment of the present disclosure, the first obtaining submodule includes: a first selection unit, configured to: determine that a first candidate cell bars the mobile terminal from camping on or accessing to the first candidate cell, and select the target cell to camp on from the other candidate cells except the first candidate cell, in a case that frequency point information corresponding to the first candidate cell in the candidate cells indicates that the first candidate cell supports the first serving frequency point for uplink transmission or does not support a second serving frequency point of the NR communication system for uplink transmission, and an uplink frequency point supported by the mobile terminal does not include the first serving frequency point.

In the mobile terminal according to an embodiment of the present disclosure, the first obtaining submodule includes:
a correction unit, configured to correct a determination parameter used in performing cell reselection or cell selection for each of the candidate cells based on a preset offset parameter, in a case that the resource indication information includes the frequency point information corresponding to the candidate cells, where the determination parameter is calculated according to an S criterion or an R criterion for cell selection; and
a determination unit, configured to determine the target cell according to the corrected determination parameter.

In the mobile terminal according to an embodiment of the present disclosure, the correction unit is configured to: add the preset offset parameter to the determination parameter, in a case that an uplink frequency point supported by the mobile terminal includes the first serving frequency point, and the frequency point information corresponding to each of the candidate cells indicates that the each candidate cell supports the first serving frequency point for uplink transmission or does not support a second serving frequency point of the NR communication system for uplink transmission; or otherwise, subtracting the preset offset parameter from the determination parameter.

In the mobile terminal according to an embodiment of the present disclosure, the first obtaining submodule includes:
a setting unit, configured to set camping priorities for the candidate cells according to the frequency point supported by the mobile terminal and the frequency point information corresponding to the candidate cells; and
a selection unit, configured to select the target cell to camp on from the candidate cells according to the camping priorities of the candidate cells.

In the mobile terminal according to an embodiment of the present disclosure, the setting unit is configured to: increase a camping priority of each of the candidate cells, in a case that an uplink frequency point supported by the mobile terminal includes the first serving frequency point, and the frequency point information corresponding to the each candidate cell indicates that the each candidate cell supports the first serving frequency point for uplink transmission or does not support a second serving frequency point of the NR communication system for uplink transmission; or otherwise, decrease the camping priority of the each candidate cell.

In the mobile terminal according to an embodiment of the present disclosure, the obtaining module 501 includes: a second obtaining submodule, configured to determine an available uplink frequency point as the target resource, in a case that the resource indication information includes the available uplink frequency point, where the available uplink frequency point is configured by the base station according to capability information reported by the mobile terminal, and the capability information includes an uplink frequency point supported by the mobile terminal.

According to an embodiment of the present disclosure, the mobile terminal further includes: a first transmission module, configured to transmit the capability information of the mobile terminal to the base station, where the capability information includes the uplink frequency point supported by the mobile terminal.

In the mobile terminal according to an embodiment of the present disclosure, the capability information further includes: whether the mobile terminal supports using the first serving frequency point as the uplink frequency point to perform access or perform uplink data transmission in a slot corresponding to downlink transmission.

In the mobile terminal according to an embodiment of the present disclosure, the communication module 502 is configured to:
perform camping according to the target resource, or perform access and/or uplink transmission according to the target resource after camping is performed according to the target resource; or
perform access according to the target resource, or perform uplink transmission according to the target resource access after access is performed according to the target resource; or
perform uplink transmission according to the target resource.

In the mobile terminal according to an embodiment of the present disclosure, the communication module 502 is configured to:
perform camping according to a frequency point for camping, or perform access and/or uplink transmission according to the frequency point for camping after camping is performed according to the frequency point for camping, in a case that the target resource includes the frequency point for camping;
perform access according to a frequency point for access, or perform uplink transmission according to the frequency point for access after access is performed according to the frequency point for access, in a case that the target resource includes the frequency point for access; and
perform uplink transmission according to a frequency point for uplink transmission, in a case that the target resource includes the frequency point for uplink transmission.

In the mobile terminal according to an embodiment of the present disclosure, the communication module 502 includes:
a third obtaining submodule, configured to obtain a first signal strength threshold corresponding to the first serving frequency point and a second signal strength threshold corresponding to a second serving frequency point, in a case that the target resource includes the first serving frequency point and the second serving frequency point; and
a first selection submodule, configured to select the first serving frequency point or the second serving frequency point to camp on, according to the first signal strength threshold, the second signal strength threshold, and a current reference signal received power RSRP.

In the mobile terminal according to an embodiment of the present disclosure, the third obtaining submodule is configured to obtain, through a first notification message broadcasted by the base station, the first signal strength threshold corresponding to the first serving frequency point and the second signal strength threshold corresponding to the second serving frequency point.

In the mobile terminal according to an embodiment of the present disclosure, the communication module 502 includes:
a fourth obtaining submodule, configured to obtain a third signal strength threshold corresponding to the first serving frequency point and a fourth signal strength threshold corresponding to a second serving frequency point, in a case that the target resource includes the first serving frequency point and the second serving frequency point; and a second selection submodule, configured to select the first serving frequency point or the second serving frequency point to access, according to the third signal strength threshold, the fourth signal strength threshold, and a current reference signal received power RSRP.

In the mobile terminal according to an embodiment of the present disclosure, the fourth obtaining submodule is configured to obtain, through a second notification message broadcasted by the base station, the third signal strength threshold corresponding to the first serving frequency point and the fourth signal strength threshold corresponding to the second serving frequency point.

In the mobile terminal according to an embodiment of the present disclosure, the communication module 502 is configured to perform access or uplink transmission in a slot except a predetermined slot and by using the first serving frequency point as an uplink frequency point, where the predetermined slot is a slot used to perform downlink reception by the mobile terminal on a downlink serving frequency point of the NR communication system.

In the mobile terminal according to an embodiment of the present disclosure, the predetermined slot includes:

a slot in which downlink reception is performed in a connected mode and using the downlink serving frequency point, and a slot in which downlink reception is performed in an idle mode and using the downlink serving frequency point, the slot in which downlink reception is performed in the connected mode and using the downlink serving frequency point includes: a slot for receiving downlink control information, a slot for receiving downlink data, a slot for receiving a broadcast message, a slot for receiving a paging message, and a slot for receiving reference information, and the slot in which downlink reception is performed in the idle mode and using the downlink serving frequency point includes: a slot for receiving downlink control information, a slot for receiving a paging message, and a slot for receiving reference information.

The mobile terminal according to the embodiments of the present disclosure obtains a target resource for an uplink communication in a current communication process, where a frequency point corresponding to the target resource includes a first serving frequency point of a LTE communication system, a communication system where a mobile terminal is located is a new radio NR communication system, and communicates with a base station according to the target resource. In the embodiments of the present disclosure, uplink transmission may be performed by using the first serving frequency point of the LTE communication system and the second serving frequency point of the NR communication system, and communication with the base station is achieved on the premise of sharing an uplink frequency point.

It should be noted that the mobile terminal is a terminal corresponding to the foregoing method embodiments. All the implementation manners in the foregoing method embodiments are applicable to the embodiments of the mobile terminal, and the same technical effects can be achieved.

Figure 6:
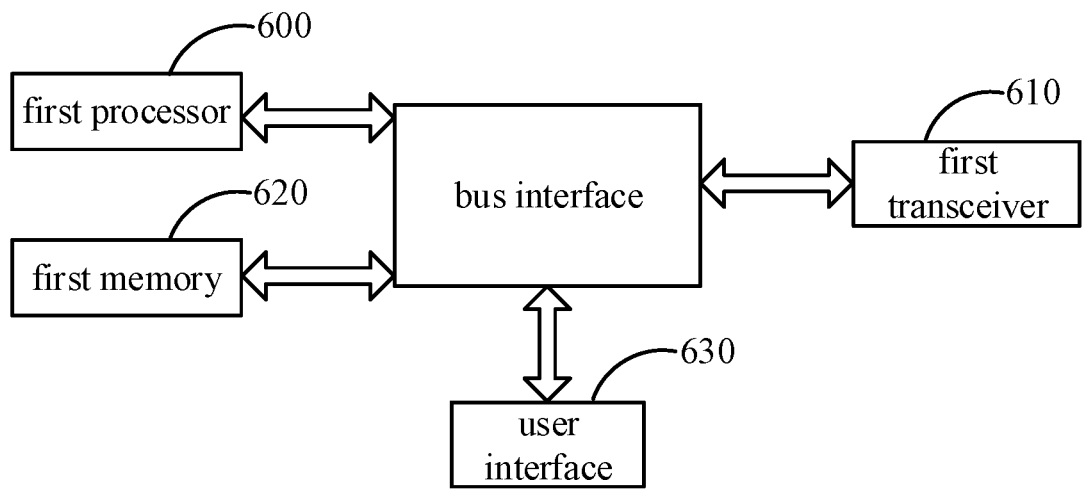
FIG. 6 is a structural block diagram of a mobile terminal according to other embodiments of the present disclosure.

In order to better achieve the above objective, as shown in FIG. 6, embodiments of the present disclosure further provide a mobile terminal, which includes a first memory 620, a first processor 600, a first transceiver 610, a user interface 630, a bus interface and a first computer program stored on the first memory 620 and executable on the first processor 600. The first processor 600 is configured to read the program in the first memory 620, and perform the following processes:

obtaining a target resource for an uplink communication in a current communication process, where a frequency point corresponding to the target resource includes a first serving frequency point of a non-new radio NR communication system, and a communication system where the mobile terminal is located is a new radio NR communication system; and communicating with a base station according to the target resource.

In FIG. 6, the bus architecture may include any number of interconnected buses and bridges, specifically linked by one or more processors represented by the first processor 600 and various circuits of memory represented by the first memory 620. The bus architecture may also connect various other circuits such as peripherals, voltage regulators and power management circuits, which is well known in the art. Therefore, a detailed description thereof is omitted herein. The bus interface provides an interface. The first transceiver 610 may be multiple components, such as multiple receivers and transmitters, providing means for communicating with various other devices on a transmission medium. For different user equipment, the user interface 630 may also be an interface capable of externally or internally connecting the required devices, including but not limited to a keypad, a display, a speaker, a microphone, a joystick, and the like.

The first processor 600 is responsible for the management of the bus architecture and general processing, and the first memory 620 can store data used by the first processor 600 in performing operations.

Optionally, the frequency point corresponding to the target resource further includes a second serving frequency point of the new radio NR communication system.

The first processor 600 is further configured to: obtain the target resource for the uplink communication in the current communication process based on an agreement of a predefined protocol.

The first processor 600 is further configured to: obtain the target resource for the uplink communication in the current communication process according to resource indication information transmitted by the base station.

The first processor 600 is further configured to: select a target cell to camp on from candidate cells according to a frequency point supported by the mobile terminal, in a case that the resource indication information includes frequency point information corresponding to the candidate cells, and determining the target cell as the target resource.

The first processor 600 is further configured to: determine that a first candidate cell bars the mobile terminal from camping on or accessing to the first candidate cell, and selecting the target cell to camp on from the other candidate cells except the first candidate cell, in a case that frequency point information corresponding to the first candidate cell in the candidate cells indicates that the first candidate cell supports the first serving frequency point for uplink transmission or does not support a second serving frequency point of the NR communication system for uplink transmission, and an uplink frequency point supported by the mobile terminal does not include the first serving frequency point.

The first processor 600 is further configured to: correct a determination parameter used in performing cell reselection or cell selection for each of the candidate cells based on a preset offset parameter, in a case that the resource indication information includes the frequency point information corresponding to the candidate cells, where the determination parameter is calculated according to an S criterion or an R criterion for cell selection; and determine the target cell according to the corrected determination parameter.

The first processor 600 is further configured to: add the preset offset parameter to the determination parameter, in a case that the uplink frequency point supported by the mobile terminal includes the first serving frequency point, and the frequency point information corresponding to the first candidate cell in the candidate cells indicates that the first candidate cell supports the first serving frequency point for uplink transmission or does not support the second serving frequency point of the NR communication system for uplink transmission; or otherwise, subtract the preset offset parameter from the determination parameter.

The first processor 600 is further configured to: set camping priorities for the candidate cells according to the frequency point supported by the mobile terminal and the frequency point information corresponding to the candidate cells; and select the target cell to camp on from the candidate cells according to the respective camping priorities of the candidate cells.

The first processor 600 is further configured to: increase the camping priority of a first candidate cell of the candidate cells, in a case that the uplink frequency point supported by the mobile terminal includes a first serving frequency point, and the frequency point information corresponding to the first candidate cell indicates that the first candidate cell supports the first serving frequency point for uplink transmission or does not support the second serving frequency point of the NR communication system for uplink transmission; or otherwise, decrease the camping priority of the first candidate cell.

The first processor 600 is further configured to: determine an available uplink frequency point as the target resource, in a case that the resource indication information includes the available uplink frequency point, where the available uplink frequency point is configured by the base station according to capability information reported by the mobile terminal, and the capability information includes an uplink frequency point supported by the mobile terminal.

The first processor 600 is further configured to: transmit the capability information of the mobile terminal to the base station, where the capability information includes the uplink frequency point supported by the mobile terminal.

Optionally, the capability information further includes: whether the mobile terminal supports using the first serving frequency point as the uplink frequency point to perform access or perform uplink data transmission in a slot corresponding to downlink transmission.

The first processor 600 is further configured to:
perform camping according to the target resource, or perform access and/or uplink transmission according to the target resource after camping is performed according to the target resource; or
perform access according to the target resource, or perform uplink transmission according to the target resource access after access is performed according to the target resource; or
perform uplink transmission according to the target resource.

The first processor 600 is further configured to:
perform camping according to a frequency point for camping, or perform access and/or uplink transmission according to the frequency point for camping after camping is performed according to the frequency point for camping, in a case that the target resource includes the frequency point for camping;
perform access according to a frequency point for access, or perform uplink transmission according to the frequency point for access after access is performed according to the frequency point for access, in a case that the target resource includes the frequency point for access; and
perform uplink transmission according to a frequency point for uplink transmission, in a case that the target resource includes the frequency point for uplink transmission.

The first processor 600 is further configured to:
obtain a first signal strength threshold corresponding to the first serving frequency point and a second signal strength threshold corresponding to a second serving frequency point, in a case that the target resource includes the first serving frequency point and the second serving frequency point; and
select the first serving frequency point or the second serving frequency point to camp on, according to the first signal strength threshold, the second signal strength threshold, and a current reference signal received power RSRP.

The first processor 600 is further configured to: obtain, through a first notification message broadcasted by the base station, the first signal strength threshold corresponding to the first serving frequency point and the second signal strength threshold corresponding to the second serving frequency point.

The first processor 600 is further configured to:
obtain a third signal strength threshold corresponding to the first serving frequency point and a fourth signal strength threshold corresponding to a second serving frequency point, in a case that the target resource includes the first serving frequency point and the second serving frequency point; and
select the first serving frequency point or the second serving frequency point to access to, according to the third signal strength threshold, the fourth signal strength threshold, and a current reference signal received power RSRP.

The first processor 600 is further configured to: obtain, through a second notification message broadcasted by the base station, the third signal strength threshold corresponding to the first serving frequency point and the fourth signal strength threshold corresponding to the second serving frequency point.

The first processor 600 is further configured to: perform access or uplink transmission in a slot except a predetermined slot and by using the first serving frequency point as an uplink frequency point, where the predetermined slot is a slot used to perform downlink reception by the mobile terminal by using a downlink serving frequency point of the NR communication system.

Optionally, the predetermined slot includes:
a slot in which downlink reception is performed in a connected mode and using the downlink serving frequency point, and a slot in which downlink reception is performed in an idle mode and using the downlink serving frequency point,
the slot in which downlink reception is performed in a connected mode and using the downlink serving frequency point includes: a slot for receiving downlink control information, a slot for receiving downlink data, a slot for receiving a broadcast message, a slot for receiving a paging message, and a slot for receiving reference information, and the slot in which downlink reception is performed in an idle mode and using the downlink serving frequency point includes: a slot for receiving downlink control information, a slot for receiving a paging message, and a slot for receiving reference information.

In some embodiments of the present disclosure, a computer readable storage medium is further provided, on which a first computer program is stored. The first computer program is executed by the processor to implement the following steps:

obtaining a target resource for an uplink communication in a current communication process, where a frequency point corresponding to the target resource includes a first serving frequency point of a non-new radio NR communication system, and a communication system where the mobile terminal is located is a new radio NR communication system; and communicating with a base station according to the target resource.

Figure 7:
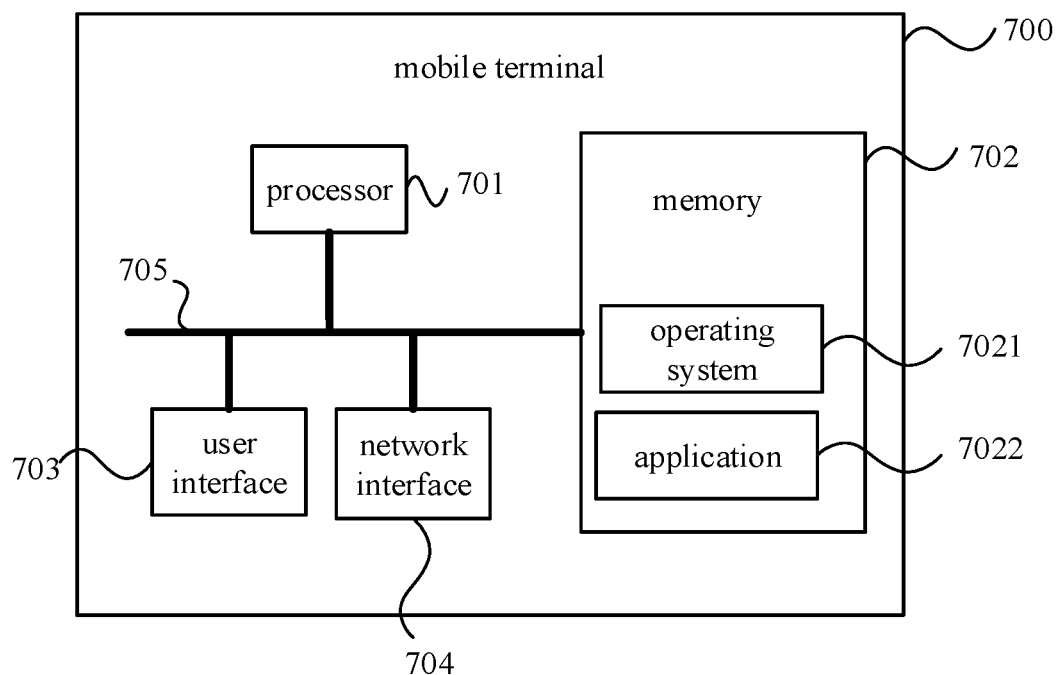
FIG. 7 is a structural block diagram of a mobile terminal according to other embodiments of the present disclosure.

As shown in FIG. 7, another structural block diagram of a mobile terminal is provided according to embodiments of the present disclosure, which includes: at least one processor 701, a memory 702, at least one network interface 704, and other user interfaces 703. Various components in mobile terminal 700 are coupled together by a bus system 705. It may be appreciated that the bus system 705 is configured to implement connections and communications among these components. The bus system 705 includes a power supply bus, a control bus and a state signal bus, in addition to the data bus. However, for clarity of description, the various buses are denoted by bus system 705 in FIG. 7.

The user interface 703 may include a display, a keyboard, or a click device (e.g., a mouse, a trackball, a touchpad, or a touch screen).

It is understandable that the memory 702 in the embodiments of the present disclosure may be a volatile memory or a non-volatile memory, or may include both volatile and non-volatile memories. The non-volatile memory may be a read-only memory (ROM), a programmable read-only memory (PROM), an erasable programmable read-only memory (EPROM), or an electrically erasable programmable read-only memory (EEPROM) or a flash memory. The volatile memory may be a random access memory (RAM) that acts as a high-speed external cache. By way of example and not limitation, many kinds of RAM are viable, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchlink connection dynamic random access memory (SDRAM) and direct memory bus random access memory (DRRAM). The memory 402 of the systems and methods described herein is intended to include, but not limited to, these and any other suitable types of memory.

In some implementations, the memory 702 stores following elements, such as executable modules, data structures, or a subset thereof, or an extended set thereof, which may include an operating system 7021 and an application 7022.

The operating system 7021 includes various system programs, such as a framework layer, a core library layer, a driver layer, and the like, for implementing various basic services and processing hardware-based tasks. The application 7022 includes various applications programs, such as a media player (Media Player), a browser (Browser), and the like, for implementing various application services. A program for implementing the method according to the embodiments of the present disclosure may be included in the application 7022.

In some embodiments of the present disclosure, by calling a program or an instruction stored in the memory 702, specifically a program or an instruction stored in the application 7022, the processor 701 is configured to obtain a target resource for an uplink communication in a current communication process, where a frequency point corresponding to the target resource includes a first serving frequency point of a non-new radio NR communication system, and a communication system where the mobile terminal is located is a new radio NR communication system; and communicate with a base station according to the target resource.

Optionally, the frequency point corresponding to the target resource further includes a second serving frequency point of the new radio NR communication system.

The processor 701 is further configured to: obtain the target resource for the uplink communication in the current communication process based on an agreement of a pre-defined protocol.

The processor 701 is further configured to: obtain the target resource for the uplink communication in the current communication process according to resource indication information transmitted by the base station.

The processor 701 is further configured to: select a target cell to camp on from candidate cells according to a frequency point supported by the mobile terminal, in a case that the resource indication information includes frequency point information corresponding to the candidate cells, and determine the target cell as the target resource.

The processor 701 is further configured to: determine that a first candidate cell bars the mobile terminal from camping on or accessing to the first candidate cell, and select the target cell to camp on from the other candidate cells except the first candidate cell, in a case that frequency point information corresponding to the first candidate cell in the candidate cells indicates that the first candidate cell supports the first serving frequency point for uplink transmission or does not support a second serving frequency point of the NR communication system for uplink transmission, and an uplink frequency point supported by the mobile terminal does not include the first serving frequency point.

The processor 701 is further configured to: correct a determination parameter used in performing cell reselection or cell selection for each of the candidate cells based on a preset offset parameter, in a case that the resource indication information includes the frequency point information corresponding to the candidate cells, where the determination parameter is calculated according to an S criterion or an R criterion for cell selection; and determine the target cell according to the corrected determination parameter.

The processor 701 is further configured to: add the preset offset parameter to the determination parameter, in a case that the uplink frequency point supported by the mobile terminal includes the first serving frequency point, and the frequency point information corresponding to a first candidate cell in the candidate cells indicates that the first candidate cell supports the first serving frequency point for uplink transmission or does not support the second serving frequency point of the NR communication system for uplink transmission; or otherwise, subtract the preset offset parameter from the determination parameter The processor 701 is further configured to: set camping priorities for the candidate cells according to the frequency point supported by the mobile terminal and the frequency point information corresponding to the candidate cells; and select the target cell to camp on from the candidate cells according to the camping priorities of the candidate cells.

The processor 701 is further configured to: increase the camping priority of a first candidate cell of the candidate cells, in a case that the uplink frequency point supported by the mobile terminal includes a first serving frequency point, and the frequency point information corresponding to the first candidate cell indicates that the first candidate cell supports the first serving frequency point for uplink transmission or does not support the second serving frequency point of the NR communication system for uplink transmission; or otherwise, decrease the camping priority of the first candidate cell.

The processor 701 is further configured to: determine an available uplink frequency point as the target resource, in a case that the resource indication information includes the available uplink frequency point, where the available uplink frequency point is configured by the base station according to capability information reported by the mobile terminal, and the capability information includes an uplink frequency point supported by the mobile terminal.

The processor 701 is further configured to: transmit the capability information of the mobile terminal to the base station through the first transceiver 610, where the capability information includes the uplink frequency point supported by the mobile terminal.

Optionally, the capability information further includes: whether the mobile terminal supports using the first serving frequency point as the uplink frequency point for performing access or performing uplink data transmission in a slot corresponding to downlink transmission.

The processor 701 is further configured to:
perform camping according to the target resource, or perform access and/or uplink transmission according to the target resource after camping is performed according to the target resource; or
perform access according to the target resource, or perform uplink transmission according to the target resource access after access is performed according to the target resource; or
perform uplink transmission according to the target resource.

The processor 701 is further configured to:
perform camping according to a frequency point for camping, or perform access and/or uplink transmission according to the frequency point for camping after camping is performed according to the frequency point for camping, in a case that the target resource includes the frequency point for camping;
perform access according to a frequency point for access, or perform uplink transmission according to the frequency point for access after access is performed according to the frequency point for access, in a case that the target resource includes the frequency point for access; and
perform uplink transmission according to a frequency point for uplink transmission, in a case that the target resource includes the frequency point for uplink transmission.

The processor 701 is further configured to: obtain a first signal strength threshold corresponding to the first serving frequency point and a second signal strength threshold corresponding to a second serving frequency point, in a case that the target resource includes the first serving frequency point and the second serving frequency point; and select the first serving frequency point or the second serving frequency point to camp on, according to the first signal strength threshold, the second signal strength threshold, and a current reference signal received power RSRP.

The processor 701 is further configured to: obtain, through a first notification message broadcasted by the base station, and the first signal strength threshold corresponding to the first serving frequency point and the second signal strength threshold corresponding to the second serving frequency point.

The processor 701 is further configured to: obtain a third signal strength threshold corresponding to the first serving frequency point and a fourth signal strength threshold corresponding to a second serving frequency point, in a case that the target resource includes the first serving frequency point and the second serving frequency point; and select the first serving frequency point or the second serving frequency point to access, according to the third signal strength threshold, the fourth signal strength threshold, and a current reference signal received power RSRP.

The processor 701 is further configured to: obtain, through a second notification message broadcasted by the base station, the third signal strength threshold corresponding to the first serving frequency point and the fourth signal strength threshold corresponding to the second serving frequency point.

The processor 701 is further configured to: perform access or uplink transmission in a slot except a predetermined slot and by using the first serving frequency point as an uplink frequency point, where the predetermined slot is a slot used to perform downlink reception by the mobile terminal on a downlink serving frequency point of the NR communication system.

Optionally, the predetermined slot includes:
a slot in which downlink reception is performed in a connected mode and using the downlink serving frequency point, and a slot in which downlink reception is performed in an idle mode and using the downlink serving frequency point,
the slot in which downlink reception is performed in a connected mode and using the downlink serving frequency point includes: a slot for receiving downlink control information, a slot for receiving downlink data, a slot for receiving a broadcast message, a slot for receiving a paging message, and a slot for receiving reference information, and
the slot in which downlink reception is performed in an idle mode and using the downlink serving frequency point includes: a slot for receiving downlink control information, a slot for receiving a paging message, and a slot for receiving reference information.

In the mobile terminal 700 according to the embodiments of the present disclosure, the processor 701 is configured to obtain a target resource for an uplink communication in a current communication process, where a frequency point corresponding to the target resource includes a first serving frequency point of a LTE communication system, a communication system where a mobile terminal is located is a new radio NR communication system, and communicate with a base station according to the target resource. In the embodiments of the present disclosure, uplink transmission may be performed by using the first serving frequency point of the LTE communication system and the second serving frequency point of the NR communication system, and communication with the base station is achieved on the premise of sharing an uplink frequency point.

The mobile terminal of the present disclosure may be, for example, a mobile phone, a tablet computer, a personal digital assistant (PDA), or a vehicle-mounted computer, or the like.

The mobile terminal 700 can implement various processes implemented by the terminal in the foregoing embodiments, which is not described herein again to avoid repetition.

The methods disclosed in the above embodiments of the present disclosure may be applied to the processor 701 or implemented by the processor 701. The processor 701 may be an integrated circuit chip with signal processing capabilities. In implementations, each step of the foregoing method may be completed by an integrated logic circuit in form of hardware in the processor 701 or by an instruction in form of software. The processor 701 may be a general-purpose processor, a digital signal processor (DSP), an application specific integrated circuit (ASIC), a field programmable gate array (FPGA) or any other programmable logic device, discrete gate, transistor logic device or discrete hardware component, which can implement or carry out the methods, steps, and logical block diagrams according to the embodiments of the present disclosure. The general-purpose processor may be a microprocessor, or the processor may be any conventional processor or the like. The steps of the methods according to the embodiments of the present disclosure may be directly implemented by a hardware decoding processor, or may be performed by a combination of hardware and software modules in the decoding processor. The software module can be located in a conventional storage medium such as a random access memory, a flash memory, a read-only memory, a programmable read-only memory, an electrically erasable programmable memory, a registers, or the like. The storage medium is located in the memory 702, and the processor 701 reads the information from the memory 702 and completes steps of the above methods in combination with its hardware.

It is understandable that the embodiments described herein can be implemented in hardware, software, firmware, middleware, microcode, or a combination thereof. For hardware implementation, the processing unit can be implemented in one or more of an application specific integrated circuit (ASIC), a digital signal processor (DSP), a digital signal processing device (DSPD), a programmable logic device (PLD), a field-programmable gate array (FPGA), a general-purpose processor, a controller, a microcontroller, a microprocessor, other electronic units for performing functions according to the present disclosure, or a combination of the above.

For software implementation, the technical solutions in the specification may be implemented by modules (for example, processes, functions, and so on) for performing the functions in the present disclosure. The software code may be stored in the memory and executed by the processor, and the memory may be implemented inside or outside the processor.

Figure 8:
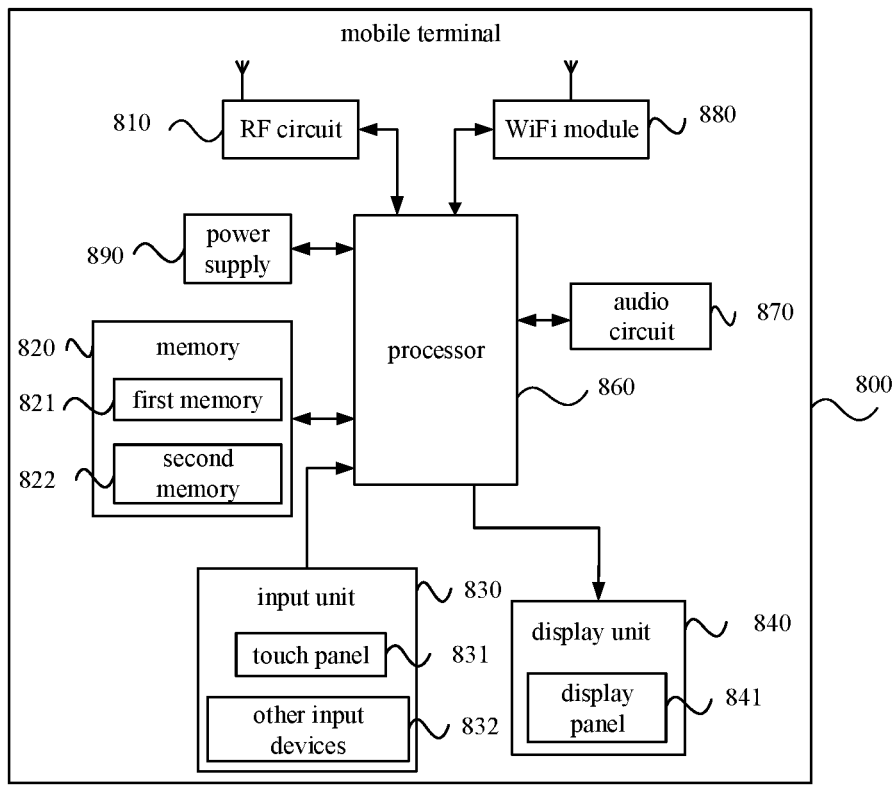
FIG. 8 is a structural block diagram of a mobile terminal according to other embodiments of the present disclosure.

As shown in FIG. 8, FIG. 8 is another structural block diagram of a mobile terminal according to embodiments of the present disclosure. The mobile terminal 800 shown in FIG. 8 includes a radio frequency (RF) circuit 810, a memory 820, an input unit 830, a display unit 840, a processor 860, an audio circuit 870, a Wireless Fidelity (WiFi) module 8100, and a power supply 890.

The input unit 830 may be configured to receive numeric or character information inputted by a user, and to generate signal inputs related to user settings and function control of the mobile terminal 800. Specifically, in an embodiment of the present disclosure, the input unit 830 may include a touch panel 831. The touch panel 831, also referred to as a touch screen, may collect touch operations by the user on or near the touch panel (such as an operation performed by the user using any suitable object or accessory such as a finger or a stylus on the touch panel 831), and drive a corresponding connection apparatus according to a preset program. Optionally, the touch panel 831 may include two parts: a touch detection apparatus and a touch controller. The touch detection apparatus is configured to detect a touch position of the user, detect a signal generated due to the touch operation, and transmit the signal to the touch controller; and the touch controller is configured to receive the touch information from the touch detection device, convert the touch information into contact coordinates, send the contact coordinates to the processor 860, and receive and execute commands from the processor 860. In addition, the touch panel 831 may be implemented in various types such as resistive, capacitive, infrared, and surface acoustic waves. In addition to the touch panel 831, the input unit 830 may further include another input devices 832. The input devices 832 may include, but not limited to, one or more of a physical keyboard, a function button (such as a volume control button and a switch buttons), a trackball, a mouse, or a joystick.

The display unit 840 may be used to display information inputted by the user or information provided to the user and various menu interfaces of the mobile terminal 800. The display unit 840 may include a display panel 841. Optionally, the display panel 841 may be configured in the form of a liquid crystal display (LCD) panel or an organic light-emitting diode (OLED).

It should be noted that the touch panel 831 may cover the display panel 841 to form a touch display screen, and when the touch display screen detects a touch operation on or near it, the touch operation is transmitted to the processor 860 to determine the type of the touch event, and then the processor 860 provides a corresponding visual output on the touch display screen based on the type of touch event.

The touch display screen includes an application interface display region and a commonly-used control display area. An arrangement mode of the application interface display region and the common control display region is not limited, which may be up-and-down arrangement or left-and-right arrangement, as long as the two display regions can be distinguished from each other. The application interface display region may be used to display interfaces of applications. Each interface may include interface elements such as at least one application icon and/or widget desktop control. The application interface display region may also be an empty interface that does not contain any content. The commonly-used control display region is used to display controls which are used frequently, for example, a setting button, an interface number, a scroll bar, and application icons such as a phone book icon.

The processor 860 is the control center of the mobile terminal 800, which connects various parts of the entire mobile phone by using various interfaces and wirings, performs functions of the mobile terminal 800 and process data by running or executing software programs and/or modules stored in a first memory 821 and invoking data stored in a second memory 822, thereby performing overall monitoring on the mobile terminal 800. Optionally, the processor 860 may include one or more processing units.

In an embodiment of the present disclosure, by invoking the software programs and/or modules stored in the first memory 821 and the data stored in the second memory 822, the processor 860 is configured to: obtain a target resource for an uplink communication in a current communication process, where a frequency point corresponding to the target resource includes a first serving frequency point of a non-new radio NR communication system, and a communication system where the mobile terminal is located is a new radio NR communication system; and communicate with a base station according to the target resource.

Optionally, the frequency point corresponding to the target resource further includes a second serving frequency point of the new radio NR communication system.

The processor 860 is further configured to: obtain the target resource for the uplink communication in the current communication process based on an agreement of a predefined protocol.

The processor 860 is further configured to: obtain the target resource for the uplink communication in the current communication process according to resource indication information transmitted by the base station.

The processor 860 is further configured to: select a target cell to camp on from candidate cells according to a frequency point supported by the mobile terminal, in a case that the resource indication information includes frequency point information corresponding to the candidate cells, and determine the target cell as the target resource.

The processor 860 is further configured to: determine that a first candidate cell bars the mobile terminal from camping on or accessing to the first candidate cell, and select the target cell to camp on from the other candidate cells except the first candidate cell, in a case that frequency point information corresponding to the first candidate cell in the candidate cells indicates that the first candidate cell supports the first serving frequency point for uplink transmission or does not support a second serving frequency point of the NR communication system for uplink transmission, and an uplink frequency point supported by the mobile terminal does not include the first serving frequency point.

The processor 860 is further configured to: correct a determination parameter used in performing cell reselection or cell selection for each of the candidate cells based on a preset offset parameter, in a case that the resource indication information includes the frequency point information corresponding to the candidate cells, where the determination parameter is calculated according to an S criterion or an R criterion for cell selection; and determine the target cell according to the corrected determination parameter.

The processor 860 is further configured to: add the preset offset parameter to the determination parameter, in a case that the uplink frequency point supported by the mobile terminal includes the first serving frequency point, and the frequency point information corresponding to the first candidate cell in the candidate cells indicates that the first candidate cell supports the first serving frequency point for uplink transmission or does not support the second serving frequency point of the NR communication system for uplink transmission; or otherwise, subtract the preset offset parameter from the determination parameter The processor 860 is further configured to: set camping priorities for the candidate cells according to the frequency point supported by the mobile terminal and the frequency point information corresponding to the candidate cells; and select the target cell to camp on from the candidate cells according to the camping priorities of the candidate cells.

The processor 860 is further configured to: increase the camping priority of a first candidate cell of the candidate cells, in a case that the uplink frequency point supported by the mobile terminal includes a first serving frequency point, and the frequency point information corresponding to the first candidate cell indicates that the first candidate cell supports the first serving frequency point for uplink transmission or does not support the second serving frequency point of the NR communication system for uplink transmission; or otherwise, decrease the camping priority of the first candidate cell.

The processor 860 is further configured to: determine an available uplink frequency point as the target resource, in a case that the resource indication information includes the available uplink frequency point, where the available uplink frequency point is configured by the base station according to capability information reported by the mobile terminal, and the capability information includes an uplink frequency point supported by the mobile terminal.

The processor 860 is further configured to: transmit the capability information of the mobile terminal to the base station through the first transceiver 610, where the capability information includes the uplink frequency point supported by the mobile terminal.

Optionally, the capability information further includes: whether the mobile terminal supports using the first serving frequency point as the uplink frequency point to perform access or perform uplink data transmission in a slot corresponding to downlink transmission.

The processor 860 is further configured to:
perform camping according to the target resource, or perform access and/or uplink transmission according to the target resource after camping is performed according to the target resource; or
perform access according to the target resource, or perform uplink transmission according to the target resource access after access is performed according to the target resource; or perform uplink transmission according to the target resource.

The processor 860 is further configured to:
perform camping according to a frequency point for camping, or perform access and/or uplink transmission according to the frequency point for camping after camping is performed according to the frequency point for camping, in a case that the target resource includes the frequency point for camping;
perform access according to a frequency point for access, or perform uplink transmission according to the frequency point for access after access is performed according to the frequency point for access, in a case that the target resource includes the frequency point for access; and
perform uplink transmission according to a frequency point for uplink transmission, in a case that the target resource includes the frequency point for uplink transmission.

The processor 860 is further configured to: obtain a first signal strength threshold corresponding to the first serving frequency point and a second signal strength threshold corresponding to a second serving frequency point, in a case that the target resource includes the first serving frequency point and the second serving frequency point; and select the first serving frequency point or the second serving frequency point to camp on, according to the first signal strength threshold, the second signal strength threshold, and a current reference signal received power RSRP.

The processor 860 is further configured to: obtain, through a first notification message broadcasted by the base station, the first signal strength threshold corresponding to the first serving frequency point and the second signal strength threshold corresponding to the second serving frequency point.

The processor 860 is further configured to: obtain a third signal strength threshold corresponding to the first serving frequency point and a fourth signal strength threshold corresponding to a second serving frequency point, in a case that the target resource includes the first serving frequency point and the second serving frequency point; and select the first serving frequency point or the second serving frequency point to access, according to the third signal strength threshold, the fourth signal strength threshold, and a current reference signal received power RSRP.

The processor 860 is further configured to: obtain, through a second notification message broadcasted by the base station, the third signal strength threshold corresponding to the first serving frequency point and the fourth signal strength threshold corresponding to the second serving frequency point.

The processor 860 is further configured to: perform access or uplink transmission in a slot except a predetermined slot and by using the first serving frequency point as an uplink frequency point, where the predetermined slot is a slot used to perform downlink reception by the mobile terminal on a downlink serving frequency point of the NR communication system.

Optionally, the predetermined slot includes:
a slot in which downlink reception is performed in a connected mode and using the downlink serving frequency point, and a slot in which downlink reception is performed in an idle mode and using the downlink serving frequency point,
the slot in which downlink reception is performed in a connected mode and using the downlink serving frequency point includes: a slot for receiving downlink control information, a slot for receiving downlink data, a slot for receiving a broadcast message, a slot for receiving a paging message, and a slot for receiving reference information, and
the slot in which downlink reception is performed in an idle mode and using the downlink serving frequency point includes: a slot for receiving downlink control information, a slot for receiving a paging message, and a slot for receiving reference information.

The mobile terminal of the present disclosure may be, for example, a mobile phone, a tablet computer, a personal digital assistant (PDA), or a vehicle-mounted computer, or the like.

The mobile terminal 800 can implement various processes implemented by the terminal in the foregoing embodiments, which is not described herein again to avoid repetition.

In the mobile terminal 800 according to the embodiments of the present disclosure, the processor 860 is configured to obtain a target resource for an uplink communication in a current communication process, where a frequency point corresponding to the target resource includes a first serving frequency point of a LTE communication system, a communication system where a mobile terminal is located is a new radio NR communication system, and communicate with a base station according to the target resource. In the embodiments of the present disclosure, uplink transmission may be performed by using the first serving frequency point of the LTE communication system and the second serving frequency point of the NR communication system, and communication with the base station is achieved on the premise of sharing an uplink frequency point.

Figure 9:
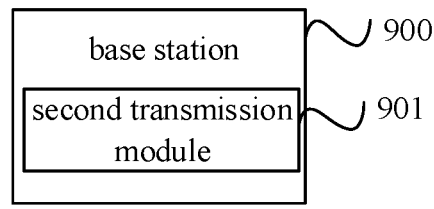
FIG. 9 is a structural block diagram of a base station according to some embodiments of the present disclosure.

As shown in FIG. 9, embodiments of the present disclosure further provides a base station 900, which includes a second transmission module 901, configured to transmit resource indication information to a mobile terminal, to enable the mobile terminal to determine a target resource for an uplink communication in a current communication process according to the resource indication information and communicate with the base station according to the target resource, where a frequency point corresponding to the target resource includes a first serving frequency point of a non-new radio NR communication system, and a communication system where the mobile terminal is located is a new radio NR communication system.

In the base station according to an embodiment of the present disclosure, the frequency point corresponding to the target resource further includes a second serving frequency point of the new radio NR communication system.

In the base station according to an embodiment of the present disclosure, the second transmission module 901 is configured to transmit the resource indication information through at least one of: a reference signal, a physical broadcast channel, system information, or a dedicated radio resource control RRC signaling.

In the base station according to an embodiment of the present disclosure, the second transmission module is configured to transmit the resource indication information to the mobile terminal by using a newly added reference signal or a newly added channel; or transmitting the resource indication information to the mobile terminal by using a reference signal or a channel newly added into a synchronization signal block.

In the base station according to an embodiment of the present disclosure, the second transmission module is configured to transmit frequency point information corresponding to the candidate cells to the mobile terminal as the resource indication information.

In the base station according to an embodiment of the present disclosure, the second transmission module includes:
a fifth obtaining submodule, configured to obtain capability information transmitted by the mobile terminal, where the capability information includes a frequency point supported by the mobile terminal; and
a configuration submodule, configured to configure, according to the frequency point supported by the mobile terminal, an available uplink frequency point for the mobile terminal, and transmitting the available uplink frequency point as the resource indication information to the mobile terminal.

In the base station of the embodiment of the present disclosure, the capability information further includes: whether the mobile terminal supports using the first serving frequency point as the uplink frequency point to perform access or perform uplink data transmission in a slot corresponding to downlink transmission.

The configuration submodule is configured to configure the first serving frequency point as the available uplink frequency point in a slot that is not used by the mobile terminal to perform downlink reception on a downlink serving frequency point, in a case that the mobile terminal does not support using the first serving frequency point as the uplink frequency point to perform access or perform uplink data transmission in the slot corresponding to downlink transmission.

In the base station according to the embodiments of the present disclosure and in the communication method according to the embodiments of the present disclosure, resource indication information is transmitted to a mobile terminal, so that the mobile terminal obtains a target resource for an uplink communication in a current communication process, and communicates with a base station according to the target resource, where a frequency point corresponding to the target resource includes a first serving frequency point of a LTE communication system, a communication system where a mobile terminal is located is a new radio NR communication system. In the embodiments of the present disclosure, uplink transmission may be performed by using the first serving frequency point of the LTE communication system and the second serving frequency point of the NR communication system, and communication between the terminal and the base station is achieved on the premise of sharing an uplink frequency point.

Figure 10:
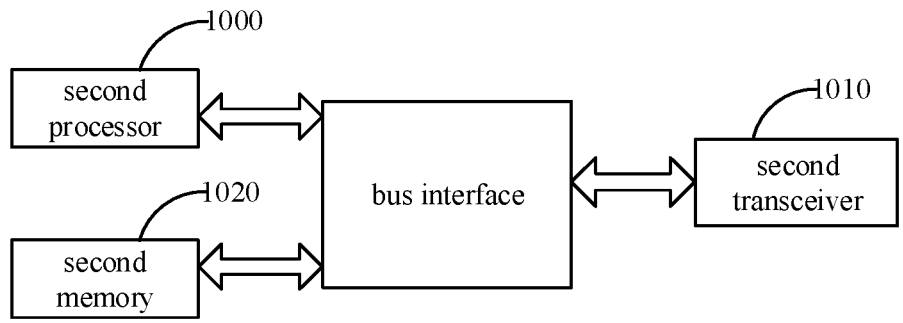
FIG. 10 is a structural block diagram of a base station according to other embodiments of the present disclosure.

In order to better achieve the above objectives, as shown in FIG. 10, embodiments of the present disclosure further provide a base station, which includes a second memory 1020, a second processor 1000, a second transceiver 1010, a bus interface, and a second computer program stored on the second memory 1020 and executable on the second processor 1000. The second processor 1000 is configured to read the program in the second memory 1020, and perform the following processes:

transmitting resource indication information to a mobile terminal, to enable the mobile terminal to determine a target resource for an uplink communication in a current communication process according to the resource indication information and communicate with the base station according to the target resource, where a frequency point corresponding to the target resource includes a first serving frequency point of a non-new radio NR communication system, and a communication system where the mobile terminal is located is a new radio NR communication system.

In FIG. 10, the bus architecture may include any number of interconnected buses and bridges, specifically linked by one or more processors represented by the second processor 1000 and various circuits of memory represented by the second memory 1020. The bus architecture may also connect various other circuits such as peripherals, voltage regulators and power management circuits, which is well known in the art. Therefore, a detailed description thereof is omitted herein. The bus interface provides an interface. The second transceiver 1010 may be multiple components, such as multiple receivers and transmitters, providing means for communicating with various other devices on a transmission medium. The second processor 1000 is responsible for the management of the bus architecture and general processing, and the second memory 1020 can store data used by the second processor 1000 in performing operations.

Optionally, the frequency point corresponding to the target resource further includes a second serving frequency point of the new radio NR communication system.

The second processor 1000 is further configured to transmit the resource indication information through at least one of: a reference signal, a physical broadcast channel, system information, or a dedicated radio resource control RRC signaling.

The second processor 1000 is further configured to transmit the resource indication information to the mobile terminal by using a newly added reference signal or a newly added channel; or transmitting the resource indication information to the mobile terminal by using a reference signal or a channel newly added into a synchronization signal block.

The second processor 1000 is further configured to transmit frequency point information corresponding to the candidate cells to the mobile terminal as the resource indication information.

The second processor 1000 is further configured to obtain capability information transmitted by the mobile terminal, where the capability information includes a frequency point supported by the mobile terminal; and configure, according to the frequency point supported by the mobile terminal, an available uplink frequency point for the mobile terminal, and transmitting the available uplink frequency point as the resource indication information to the mobile terminal.

Optionally, the capability information further includes: whether the mobile terminal supports using the first serving frequency point as the uplink frequency point to perform access or perform uplink data transmission in a slot corresponding to downlink transmission.

The second processor 1000 is further configured to: configure the first serving frequency point as the available uplink frequency point in a slot that is not used by the mobile terminal to perform downlink reception on a downlink serving frequency point, in a case that the mobile terminal does not support using the first serving frequency point as the uplink frequency point to perform access or perform uplink data transmission in the slot corresponding to downlink transmission.

In some embodiments of the present disclosure, a computer readable storage medium is further provided, on which a second computer program is stored. The program is executed by the processor to implement the following steps:

transmitting resource indication information to a mobile terminal, to enable the mobile terminal to determine a target resource for an uplink communication in a current communication process according to the resource indication information and communicate with the base station according to the target resource, where a frequency point corresponding to the target resource includes a first serving frequency point of a non-new radio NR communication system, and a communication system where the mobile terminal is located is a new radio NR communication system.

A person of ordinary skill in the art may well appreciate that units and algorithm steps of various examples described in conjunction with the embodiments according to the present disclosure can be implemented in the form of electronic hardware or a combination of computer software and electronic hardware. Whether these functions are performed in hardware or software depends on specific applications and design constraints of the technical solution. A person of ordinary skill in the art can use different methods to implement the described functions for each particular application, but such implementations should not be considered as going beyond the scope of the present disclosure.

A person of ordinary skill in the art can clearly understand that for convenience and brevity of description, reference can be made to the corresponding processes in the foregoing method embodiments for specific operating processes of the systems, the devices and the units described above, which are not described herein redundantly.

It should be understood that in the embodiments according to the present application, the disclosed apparatuses and methods may be implemented in other manners. For example, the apparatus embodiments described above are merely illustrative. For example, the division of the units is only a logical function division, and in practical implementation, there may be another manner of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

The units described as separate components may or may not be physically separated, and the components shown as units may or may not be physical units, that is, they may be located in one place or distributed to multiple network units. Some or all of the units may be selected according to practical needs to achieve the objectives of the technical solutions of the embodiments.

In addition, functional units in various embodiments of the present disclosure may be integrated into one processing unit, or each unit may exist physically separately, or two or more units may be integrated into one unit.

In a case that the functions are implemented in the form of a software functional unit which is sold or used as a standalone product, the product may be stored in a computer readable storage medium. Based on such understanding, the essence or the portion of the technical solutions of the present disclosure that contributes to the prior art may be embodied in the form of a software product. The computer software product is stored in a storage medium, which includes instructions that cause a computer device (which may be a personal computer, a server or a network device) to perform all or part of the steps of the methods according to the embodiments of the present disclosure. The foregoing storage medium may include any storage medium that can store program codes, such as a USB flash drive, a mobile hard disk, a ROM, a RAM, a magnetic disk, or an optical disk.

A person of ordinary skill in the art can understand that all or part of processes of implementing the above method embodiments can be completed by a computer program instructing related hardware, the program can be stored in a computer readable storage medium, and when the program is executed, the processes of the above method embodiments can be implemented. The storage medium may be a magnetic disk, an optical disk, a read-only memory (ROM), a random access memory (RAM), or the like.

The above-described embodiments are merely some specific embodiments of the present disclosure, but the scope of the present disclosure is not limited to the embodiments. Any modifications, substitutions or improvements within principles of the present disclosure shall fall within the protection scope of the present disclosure.

What is claimed is:

1. A communication method, applied to a mobile terminal, comprising:
   obtaining a target resource for an uplink communication according to resource indication information transmitted by a base station, wherein the resource indication information comprises frequency point information corresponding to candidate cells, a communication system where the mobile terminal is located is a new radio (NR) communication system; and
   communicating with the base station according to the target resource;
   wherein the obtaining the target resource for the uplink communication according to the resource indication information transmitted by the base station comprises:
   adjusting, for each of the candidate cells by using a preset offset parameter, a determination parameter used in performing cell reselection or cell selection, wherein the determination parameter is calculated according to a cell selection criterion S;
   determining a target cell among the candidate cells according to the adjusted determination parameters for the candidate cells and determining a first serving frequency point corresponding to the target cell as the target resource;
   wherein the communicating with the base station according to the target resource comprises:
   performing access or uplink transmission in a slot except a predetermined slot and by using the first serving frequency point as an uplink frequency point, wherein the predetermined slot is a slot used to perform downlink reception by the mobile terminal on a downlink serving frequency point of the NR communication system, and
   wherein the predetermined slot comprises:
   a slot in which downlink reception is performed in a connected mode and using the downlink serving frequency point, and a slot in which downlink reception is performed in an idle mode and using the downlink serving frequency point,
   the slot in which downlink reception is performed in the connected mode and using the downlink serving frequency point comprises: a slot for receiving downlink control information, a slot for receiving downlink data, a slot for receiving a broadcast message, a slot for receiving a paging message, and a slot for receiving reference information, and
   the slot in which downlink reception is performed in the idle mode and using the downlink serving frequency point comprises: a slot for receiving downlink control information, a slot for receiving a paging message, and a slot for receiving reference information.

2. The communication method according to claim 1, wherein a frequency point corresponding to the target resource further comprises a second serving frequency point of the new radio (NR) communication system.

3. The communication method according to claim 1, wherein the resource indication information is transmitted through at least one of: a reference signal, a physical broadcast channel, system information, or a dedicated radio resource control (RRC) signaling.

4. The communication method according to claim 1, wherein before obtaining the target resource for the uplink communication according to the resource indication information transmitted by the base station, the method further comprises:
   transmitting capability information of the mobile terminal to the base station, wherein the capability information comprises an uplink frequency point supported by the mobile terminal, and
   wherein the capability information further comprises:
   whether the mobile terminal supports using a first serving frequency point as the uplink frequency point to perform access or perform uplink data transmission in a slot corresponding to downlink transmission.

5. The communication method according to claim 1, wherein the communicating with the base station according to the target resource comprises:
   performing camping according to the target resource, and performing access according to the target resource after camping is performed according to the target resource.

6. The communication method according to claim 5, wherein the performing camping according to the target resource comprises:

obtaining a first signal strength threshold corresponding to a first serving frequency point and a second signal strength threshold corresponding to a second serving frequency point, in a case that the target resource comprises the first serving frequency point and the second serving frequency point; and selecting the first serving frequency point or the second serving frequency point to camp on, according to the first signal strength threshold, the second signal strength threshold, and a current reference signal received power (RSRP), and wherein the obtaining the first signal strength threshold corresponding to the first serving frequency point and the second signal strength threshold corresponding to the second serving frequency point comprises:

obtaining, through a first notification message broadcasted by the base station, the first signal strength threshold corresponding to the first serving frequency point and the second signal strength threshold corresponding to the second serving frequency point.

7. The communication method according to claim 5, wherein the performing access according to the target resource comprises:

selecting a first serving frequency point or a second serving frequency point to access to, according to the first signal strength threshold, and a reference signal received power (RSRP), and in a case that the target resource comprises the first serving frequency point or the second serving frequency point.

8. A communication method, applied to a base station, comprising:

transmitting resource indication information to a mobile terminal, to enable the mobile terminal to determine a target resource for an uplink communication according to the resource indication information and communicate with the base station according to the target resource, wherein the resource indication information comprises frequency point information corresponding to candidate cells, and a communication system where the mobile terminal is located is a new radio (NR) communication system;

wherein the target resource is determined by the terminal, comprising: adjusting, for each of the candidate cells by using a preset offset parameter, a determination parameter used in performing cell reselection or cell selection, wherein the determination parameter is calculated according to a cell selection criterion S, and determining a target cell among the candidate cells according to the adjusted determination parameters for the candidate cells and determining a first serving frequency point corresponding to the target cell as the target resource;

wherein the transmitting the resource indication information to the mobile terminal comprises:

obtaining capability information transmitted by the mobile terminal, wherein the capability information comprises a frequency point supported by the mobile terminal; and configuring, according to the frequency point supported by the mobile terminal, an available uplink frequency point for the mobile terminal, and transmitting the available uplink frequency point as the resource indication information to the mobile terminal.

9. The communication method according to claim 8, wherein a frequency point corresponding to the target resource comprises a second serving frequency point of the new radio (NR) communication system.

10. The communication method according to claim 8, wherein the transmitting the resource indication information to the mobile terminal comprises:

transmitting the resource indication information through at least one of: a reference signal, a physical broadcast channel, system information, or a dedicated radio resource control (RRC) signaling.

11. The communication method according to claim 8, wherein the transmitting the resource indication information to the mobile terminal comprises:

transmitting the resource indication information to the mobile terminal by using a newly added reference signal or a newly added channel; or transmitting the resource indication information to the mobile terminal by using a reference signal or a channel newly added into a synchronization signal block.

12. The communication method according to claim 8, wherein the capability information further comprises: whether the mobile terminal supports using the first serving frequency point as the uplink frequency point to perform access or perform uplink data transmission in a slot corresponding to downlink transmission.

13. A mobile terminal, comprising:

a first memory, a first processor, and a first computer program stored on the first memory and executable on the first processor, wherein when executing the first computer program, the first processor is configured to implement the steps of the communication method according to claim 1.

14. The mobile terminal according to claim 13, wherein a frequency point corresponding to the target resource further comprises a second serving frequency point of the new radio (NR) communication system.

15. The mobile terminal according to claim 13, wherein the resource indication information is transmitted through at least one of: a reference signal, a physical broadcast channel, system information, or a dedicated radio resource control (RRC) signaling.

16. The mobile terminal according to claim 13, wherein before obtaining the target resource for the uplink communication according to the resource indication information transmitted by the base station, the first processor is further configured to:

transmit capability information of the mobile terminal to the base station, wherein the capability information comprises an uplink frequency point supported by the mobile terminal, and wherein the capability information further comprises:

whether the mobile terminal supports using a first serving frequency point as the uplink frequency point to perform access or perform uplink data transmission in a slot corresponding to downlink transmission.

17. A base station, comprising:

a first memory, a first processor, and a first computer program stored on the first memory and executable on the first processor, wherein when executing the first computer program, the first processor is configured to perform steps of the communication method according to claim 8.

18. A communication method, applied to a mobile terminal, comprising:

obtaining a target resource for an uplink communication according to resource indication information transmitted by a base station, wherein the resource indication information comprises frequency point information corresponding to candidate cells, a communication system where the mobile terminal is located is a new radio (NR) communication system; and communicating with the base station according to the target resource;

wherein the obtaining the target resource for the uplink communication according to the resource indication information transmitted by the base station comprises:

adjusting, for each of the candidate cells by using a preset offset parameter, a determination parameter used in performing cell reselection or cell selection, wherein the determination parameter is calculated according to a criterion for cell selection;

determining a target cell among the candidate cells according to the adjusted determination parameters for the candidate cells and determining a first serving frequency point corresponding to the target cell as the target resource;

wherein before obtaining the target resource for the uplink communication according to the resource indication information transmitted by the base station, the method further comprises:

transmitting capability information of the mobile terminal to the base station, wherein the capability information comprises an uplink frequency point supported by the mobile terminal, and wherein the capability information further comprises:

whether the mobile terminal supports using a first serving frequency point as the uplink frequency point to perform access or perform uplink data transmission in a slot corresponding to downlink transmission.

\* \* \* \* \*